W. LUDWIG.
PIPE BLISTER REMOVING DEVICE.
APPLICATION FILED APR. 2, 1919.
1,343,571.                                    Patented June 15, 1920.
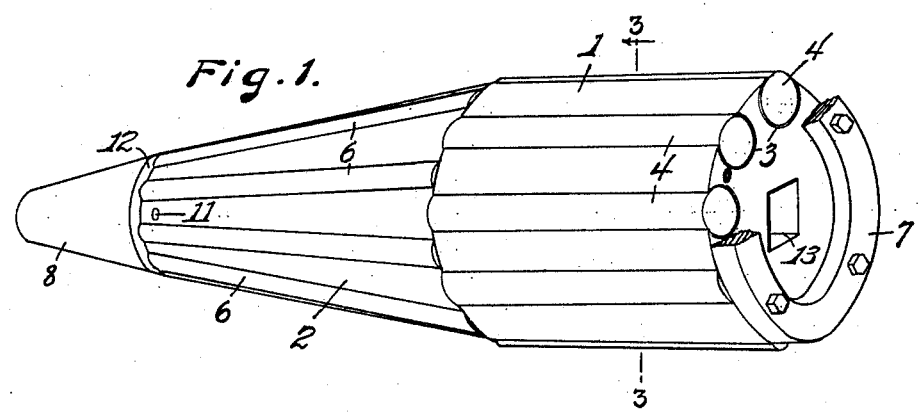
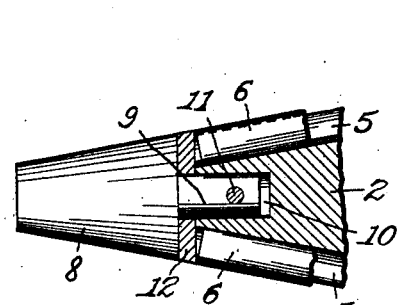
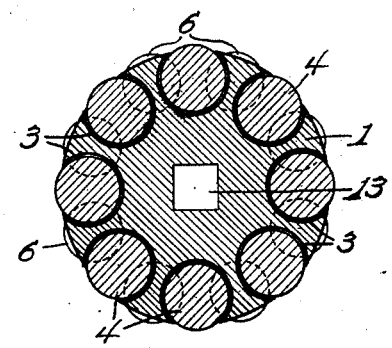
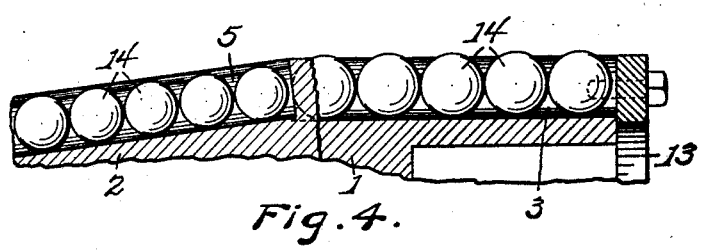
WITNESSES                    INVENTOR.
                             William Ludwig.
                             ATTORNEY.

UNITED STATES PATENT OFFICE.

WILLIAM LUDWIG, OF BELLAIRE, OHIO.

PIPE-BLISTER-REMOVING DEVICE.

1,343,571.  Specification of Letters Patent.  Patented June 15, 1920.

Application filed April 2, 1919. Serial No. 286,990.

*To all whom it may concern:*

Be it known that I, WILLIAM LUDWIG, a citizen of the United States of America, and resident of Bellaire, county of Belmont, and State of Ohio, have invented certain new and useful Improvements in Pipe-Blister-Removing Devices, of which the following is a specification.

This invention relates broadly to devices for removing deformities from the interior surfaces of metal pipes, and it has for its primary object to provide means whereby the bulbous vesicles, or blisters, which frequently form on the interior surfaces of iron pipes may be flattened out.

As is well known, in the production of iron pipes, particularly of the larger gages, it frequently happens that vesicular, or bladder-like projections, commonly termed blisters, form upon the interior surfaces of the pipes during cooling of the metal. Such blisters render the pipe practically valueless for most purposes, due either to resultant reduction in the capacity of the pipe for conducting fluids or materials, or to the fact that the pipe is weakened to the extent that it will not withstand the high internal pressures for which the pipe is tested.

The present invention has for its object to provide means for pressing and rolling out, or flattening, deformities of the character referred to for restoring the pipe to its true or normal shape, and, at the same time, to preserve intact, or unbroken, as far as is physically possible, the walls of the blister so that the strength thereof is added to that of the pipe walls at the point where the weakness created by the blister is presented.

A further object is to provide a tool of the character mentioned by means of which the pressing and rolling of the blistered surface my be effected gradually with the end in view to reduce the blister without rupture of its walls.

In describing the invention in detail, reference is herein had to the accompanying drawings, in which—

Figure 1 is a perspective view of the invention;

Fig. 2 is a partial longitudinal section of the front end of the tool;

Fig. 3 is a cross section on the line 3—3, Fig. 1; and

Fig. 4 is a longitudinal section of a fragmentary portion of the tool, illustrating a modification.

Referring to said drawings, in which like designating characters distinguish like parts throughout the several views—

1 indicates the cylindrical butt-end portion, and 2 the tapered front end portion of a one-piece headstock. Formed in the cylindrical portion 1 adjacent to the periphery thereof is a plurality of relatively-spaced longitudinally-extending cylindrical bores 3 which open throughout their lengths through said periphery, as shown. Disposed in each of said bores so as to be freely rotatable therein is a cylindrical roller 4 which, while not removable from said bore through the longitudinal surface opening of the latter because its diameter exceeds the width of said opening, protrudes outward through said opening to a suitable extent beyond the peripheral surface of the portion 1.

Longitudinal bores 5 similar to the bores 3 are provided in the tapered portion 2 of the headstock, and rollers 6 similar to the rollers 4 are rotatably mounted in these bores. The bores 3 and 5 are located in relatively staggered relation—that is, the inner ends of the bores of each series are located laterally with respect to the adjacent ends of the other series so that the rollers of each series operate independently of those of the other.

The rollers 4 are introduced in their bores 3 from the outer ends of the latter and are held in place by a suitable cap or ring, as 7, attached to the rear end face of the headstock. The rollers 6 are introduced from the opposite end of the headstock and are held in place by a conical tip 8 which is carried by the front end of the tapered portion 2 of the headstock, said tip having a stem 9 disposed within a socket 10 provided therefor in said front end and being held in place by means of a pin 11 directed transversely through said portion 2 and said stem 9. A washer 12 may be, and preferably is, interposed between the adjacent faces of said portion 2 and said tip 8, as shown in Fig. 2.

The tool described is designed for mounting upon the end of a suitable mandrel by which it is rotated, a suitable socket as 13, being provided in the rear end face for the reception of the end of such mandrel. Being introduced within the end of a pipe, the tool is rotated as it is advanced. Large internal blisters will be engaged by the rollers 6 which are rotated through frictional contact therewith and will be gradually rolled down or pressed out as the tool advances. As the rollers of the tapered portion of the tool are advanced beyond the blister, the latter is engaged by the rollers 4 of the cylindrical portion of the tool, the diameter of which more or less closely approximates that of the pipe, which rollers function to finally flatten the walls of the blister against the walls of the pipe.

In the modified construction shown in Fig. 4, a series of balls 14 is substituted in the structure hereinbefore described for each of the rollers 4 and 6.

What is claimed is—

1. A tool for flattening blisters formed on the interior surfaces of iron pipes, comprising a headstock having a cylindrical butt-end portion and a tapered front end portion, said portions presenting distinct surface areas each of which has a series of spaced longitudinally-extending bores located adjacent to and opening outward through the periphery thereof, and a cylindrical roller mounted for rotation in each of said bores, said rollers having portions of their peripheries protruding from said bores beyond the periphery of said head stock.

2. A tool for flattening blisters formed on the interior surfaces of iron pipes, comprising a headstock having a cylindrical butt-end portion and a tapered front end portion, each of said portions having a series of spaced longitudinally-extending bores located adjacent to and opening outward through the periphery thereof, and a cylindrical roller mounted for rotation in each of said bores, said rollers having portions of their peripheries protruding from said bores beyond the periphery of said headstock, the rollers of the two series being arranged in relatively staggered relation.

3. A tool for flattening blisters formed on the interior surfaces of iron pipes, comprising a headstock having a cylindrical butt-end portion and a tapered front end portion, each of said portions having a series of spaced longitudinally-extending bores located adjacent to and opening outward through the periphery thereof, the bores of the two series being arranged in staggered relation, a cylindrical roller mounted for rotation in each of said bores and having portions of their peripheries protruding from said bores to a suitable extent beyond the peripheral surface of the headstock, and means removably mounted upon the outer end of each of the two portions of said headstock in closing relation to the outer ends of the bores of said portions for maintaining said rollers against displacement.

4. In a device of the character described, the combination of a body having a straight portion and a conical end, longitudinally extending circular seats formed in said straight and conical portions, smooth-faced rollers engaging said seats, and means for holding said rollers in position.

5. In a device of the character described, the combination of a body having a straight portion and a conical end, longitudinally extending circular seats formed in said straight and conical portions, smooth-faced rollers engaging said seats and projecting beyond the same, said rollers on said conical end portion being staggered with reference to the rollers on said straight portion and means for holding said rollers in position.

6. In a device of the character described, the combination of a body having a straight portion and a conical end, longitudinally extending circular seats formed in said straight and conical portions, smooth-faced rollers fitting in said seats, said seats encircling more than one-half of said rollers, and means for holding said rollers in said seats.

7. In a device of the character described, a body having a straight portion and a conical end portion, longitudinally extending circular seats formed in said conical portion, said seats being open at their forward ends, smooth-faced rollers adapted to be inserted into said seats, said seats inclosing more than one-half of said rollers, an end piece secured to said body portion for holding said rollers in position, circular seats formed in said straight portion open at their rear ends, rollers adapted to be inserted in said seats from said rear end, said seats inclosing more than one-half of said rollers, and a plate secured to said body to hold said last-named rollers in position.

8. In a device of the character described, the combination of a body having a straight portion and a conical end portion, longitudinally extending circular seats formed in said conical portion open at their forward ends, smooth-faced rollers adapted to enter said seats from the forward end, said seats closing more than one-half of said rollers, means for holding said rollers in said seats, longitudinally extending circular seats formed in the straight portion of said body open at their rear ends, rollers adapted to enter said seats from the rear ends, said seats inclosing more than one-half of said rollers, and means for securing said last-named rollers in place, said first-named rollers being staggered with relation to said second-named rollers.

In testimony whereof I affix my signature in presence of two subscribing witnesses.

WILLIAM LUDWIG.

Witnesses:
H. E. DUNLAP,
A. L. DUNLAP.